[11] 3,578,085

[72] Inventor William G. Halbert
Butte, Mont.
[21] Appl. No. 3,230
[22] Filed Jan. 15, 1970
[45] Patented May 11, 1971
[73] Assignee Tenneco Oil Company
Houston, Tex.

[54] METHOD OF RESTORING FORMATION PERMEABILITY
5 Claims, No Drawings

[52] U.S. Cl. .......................................................... 166/307
[51] Int. Cl. ........................................................ E21b 43/27
[50] Field of Search ............................................ 166/305, 263, 307, 282; 252/8.55

[56] References Cited
UNITED STATES PATENTS

| | | | |
|---|---|---|---|
| 1,827,238 | 10/1931 | Joosten | 166/307UX |
| 2,308,414 | 1/1943 | Campbell | 166/307 |
| 2,675,083 | 4/1954 | Bond | 166/307 |
| 3,100,528 | 8/1963 | Plummer et al. | 166/307X |
| 3,149,684 | 9/1964 | Eckel et al. | 166/292X |
| 3,167,123 | 1/1965 | Graham et al. | 166/282X |
| 3,208,528 | 9/1965 | Elliott et al. | 166/305(R) |
| 3,236,306 | 2/1966 | Atwood | 166/305(R) |
| 3,482,636 | 12/1969 | Crowe | 166/307 |
| 3,508,613 | 4/1970 | Huff et al. | 166/307 |

*Primary Examiner*—Stephen J. Novosad
*Attorneys*—Eugene S. Coddou and Lee R. Larkin

ABSTRACT: A method for restoring original permeability to a subterranean oil producing formation penetrated by a well. The method includes the steps of injecting into the formation a slug of pressurized gasiform fluid, then a slug of aqueous silicate solution, retaining the solution in the formation for 2—24 hours, then removing the solution by the force of the pressurized fluid. These steps accomplish dispersal of clay particles blocking formation permeability and restoration of the formation's original permeability.

METHOD OF RESTORING FORMATION PERMEABILITY

BACKGROUND OF THE INVENTION

1. Field of the Invention

This invention generally relates to a method of restoring original permeability of a subsurface formation penetrated by a well. More specifically, this invention relates to a method of dispersing clay particles blocking the pores of a petroleum reservoir rock by injecting an aqueous solution containing a soluble silicate into the formation following an injection of pressurized gasiform fluid which provides driving power to expel the aqueous solution from the formation.

2. Description of the Prior Art

The problem of decreased permeability and decreased oil flow in a producing oil well has been recognized and many attempts at solutions for this problem have been made. The native clay contained by most petroleum reservoir rocks become mobile during production and tends to clog the area around the wellbore. The tiny mobilized clay particles congregate around the rock's pore openings in so-called "brush heaps." Prior art methods of acidizing and flushing with fresh water have given only temporary solutions to this problem.

Rather than attempting to repair damage to the formation immediately surrounding to the wellbore, the customary way of restoring permeability is to induce a fracture. This fracture is made to extend through the damaged zone and into the undisturbed portion of the reservoir. Fracturing is very expensive and only partial success has been reported.

The method of attempting to repair damage to the formation only immediately surrounding the wellbore has been attempted also. However, heretofore, only temporary relief has been obtained by injecting an alien fluid such as certain alcohols or certain acids into a very small area immediately surrounding the wellbore. Although the expense of attempting to affect the formation in a much wider area by fracturing is avoided by this method, it has been found that the clay will return after these acid or alcohol washings, and later will again obstruct the flow of oil to the well.

SUMMARY OF THE INVENTION

An object of this invention is to provide an improved and economical method of restoring original permeability of a subsurface formation penetrated by well. More specifically, an object of this invention is to provide an improved method to disperse the clay particles which block the pores of a petroleum reservoir.

The method of this invention for increasing permeability of a subsurface formation penetrated by a well includes the step of injecting into the formation a slug of gasiform pressurized fluid whereby the pressurized fluid provides driving power to expel a subsequently injected fluid from the formation. It also includes the step of injecting into the formation a slug of aqueous silicate solution containing $SiO_2$ and $Na_2O$ in a weight ratio in the range of about 1.25—4.0 parts $SiO_2$ to 1 part $Na_2O$ and having dissolved solid content of about 24 percent—36 percent by weight $SiO_2$ and 9 percent—20 percent by weight $Na_2O$. The solution is retained in the formation for a period of about 2—24 hours, after which the solution is removed from the formation by the driving power of the pressurized gasiform fluid.

The preferred weight ratio of $SiO_2$ to $Na_2O$ is in the range of about 1.8—2.5 parts $SiO_2$ to 1 part $Na_2O$ and the preferred dissolved solids content is in the range of about 24 percent—26 percent by weight $SiO_2$ and 11 percent—13 percent by weight $Na_2O$. In certain embodiments, it is preferred that the size of the slug of aqueous silicate solution does not exceed about 4 percent of formation pore volume.

The method may also include the additional step of injecting a slug of retarded hydrofluoric acid into the formation and subsequently removing it, whereby the siliceous material immediately surrounding the well is dissolved and carried away.

Certain embodiments of the invention may include the steps of injecting a slug of gasiform pressurized fluid prior to the injection and removal of each slug of hydrofluoric acid and aqueous silicate solution, which gasiform injections provide driving power to expel the acid and the silicate solution from the formation.

The size of each of the slugs of retarded hydrofluoric acid and silicate solution preferably does not exceed about 4 percent of formation pore volume.

In carrying out one embodiment of this invention, an aqueous solution containing soluble silicates is injected into the damaged zone. This colloidal siliceous material is known to have a high surface activity and a high negative electrical charge. The soluble alkali silicate is readily absorbed by clay, causing dispersion of the congregated particles. Having dispersed the clay, the particles are then available for flow into the wellbore or dissolution by hydrofluoric acid. This remobilization and removal of clay particles causes the restoration of the formation's permeability.

Many advantages have become apparent in the use of this method for restoring permeability. The tiny clay particles which have agglomerated around the pore openings of the rocks in so-called "brush heaps" can be disaggregated by forcing each particle to assume a like negative charge. Like charges repel and adsorption of a like electrical charge by each particle will cause dispersion of the particles in the "brush heap." The dispersed or remobilized particles can be flowed out of the wellbore or can be dissolved in situ by subsequent contact with an acid known to dissolve clay.

One advantage of this invention over the prior art is that the clay particles are actually removed from the formation in the area immediately surrounding the wellbore instead of only flushed backwards into the formation by the action of injected slugs of fresh water or certain acids. Merely flushing the agglomerated clay particles back into the formation to relieve temporary stoppage of flow only leaves the particles free to again clog the area immediately surrounding the wellbore after a period of slightly increased flow. The present invention extracts the particles completely from the area surrounding the wellbore. This innovation yields a longer lasting increased permeability at a substantially reduced cost from fracturing and a cost slightly greater than short lived permeability restoration by injection of fresh water and certain acids.

Alternate embodiments and further modifications to the process will be apparent to those skilled in the art in view of the description, which is to be construed as illustrative only.

I claim:

1. In a method for increasing permeability of a subsurface formation penetrated by a well, the combination of steps comprising:

injecting a slug of gasiform pressurized fluid into said formation, whereby said pressurized fluid provides driving power to expel a subsequently injected fluid from said formation;

thereafter injecting into said formation a slug of aqueous silicate solution containing $SiO_2$ and $Na_2O$ in a weight ratio in the range of about 1.25—4.0 parts $SiO_2$ to 1 part $Na_2O$, with said solution having a dissolved solids content of about 24 percent to 36 percent by weighting $SiO_2$ and 9 percent to 20 percent by weight $Na_2O$;

retaining said pressurized fluid and said silicate solution in said formation for a period of about 2 to 24 hours;

and removing said solution from said formation by the driving power of said slug of gasiform pressurized fluid.

2. The invention as claimed in claim 1 including the additional steps of:

injecting a slug of gasiform pressurized fluid and then a slug of retarded hydrofluoric acid into said formation and subsequently removing said acid slug to thereby dissolve and assist removal of siliceous material from the area immediately surrounding said wellbore.

3. The invention as claimed in claim 2 wherein:

the size of each of said slugs of retarded hydrofluoric acid and silicate solution does not exceed about 4 percent of formation pore volume.

4. The invention as claimed in claim 1 wherein:

the size of said slug of aqueous silicate solution is less than about 4 percent of formation pore volume.

5. The invention as claimed in claim 1 wherein:
said silicate solution contains about 1.8—2.5 parts $SiO_2$ to 1 part $Na_2O$ on a weight basis, and said dissolved solids content is in the range of about 24 percent to 26 percent by weight $SiO_2$ and 11 percent to 13 percent by weight $Na_2O$.